July 9, 1940.  A. TODD  2,207,169
SANDER FOR VEHICLE WHEELS
Filed May 8, 1939  3 Sheets—Sheet 3
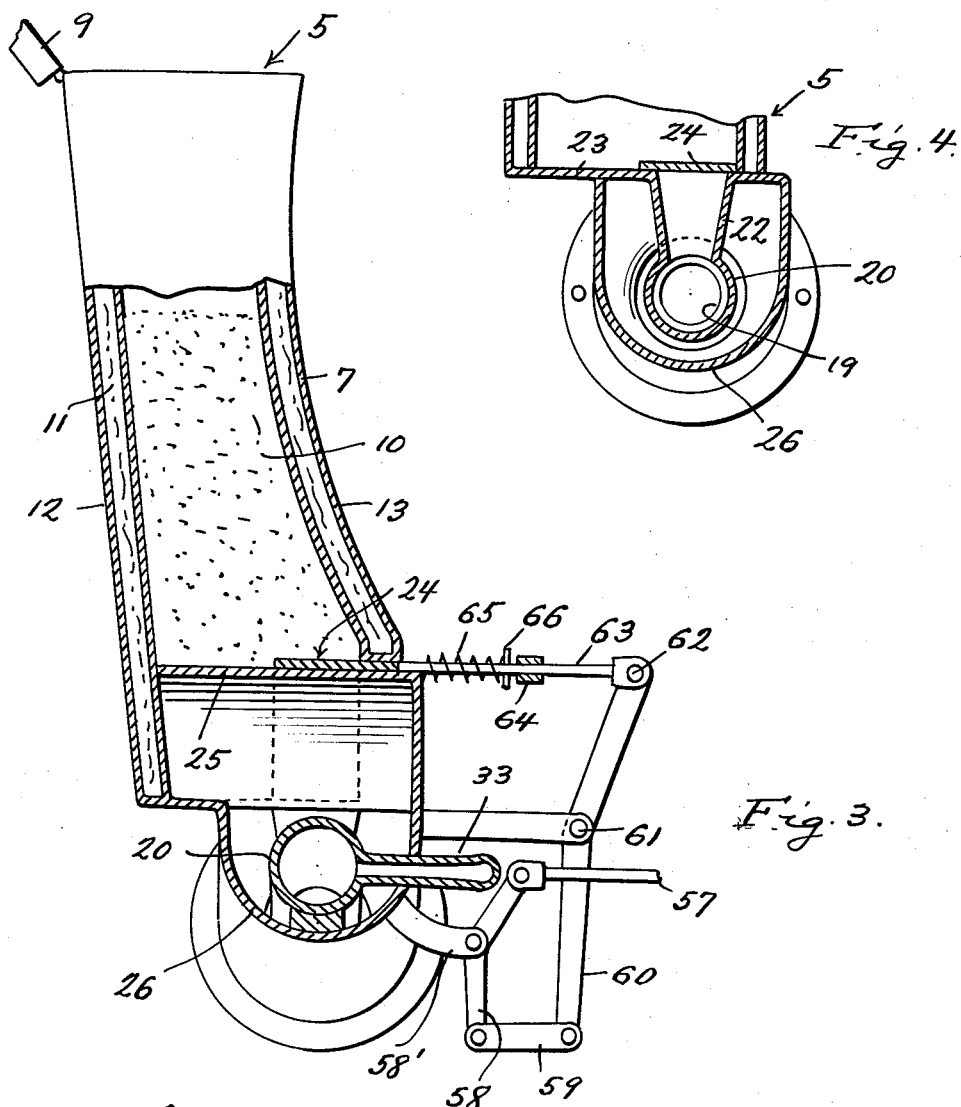
Inventor
Alfred Todd
By Clarence A. O'Brien
and Hyman Berman
Attorneys Patented July 9, 1940

2,207,169

UNITED STATES PATENT OFFICE 2,207,169

SANDER FOR VEHICLE WHEELS

Alfred Todd, Detroit, Mich.

Application May 8, 1939, Serial No. 272,473

2 Claims. (Cl. 291—3)

My invention relates generally to means for applying sand or other non-skid particles to or adjacent to the traction wheels of an automobile vehicle, and particularly to an arrangement of this character which involves a concealed compact sand reservoir, and driver-controlled engine exhaust operated means for blowing and dispensing the sand, and an important object of my invention is to provide a simple, efficient, and practical arrangement of the character indicated having special utility in regions experiencing protracted and severe cold and rain conditions.

Other important objects and advantages of my invention will be apparent from a reading of the following description taken in connection with the drawings, wherein for purposes of illustration I have set forth a preferred embodiment of my invention.

In the drawings—

Figure 3 is a transverse vertical sectional view taken through Figure 2 approximately on the line 3—3 and looking toward the right in the direction of the arrow.

Figure 4 is a transverse vertical sectional view taken through Figure 2 approximately on the line 4—4 and looking toward the right in the direction of the arrow.

Figure 5 is a horizontal sectional view taken through the blower pipe connection with the exhaust pipe of the engine and showing the arrangement of the valve therein.

Figure 2:
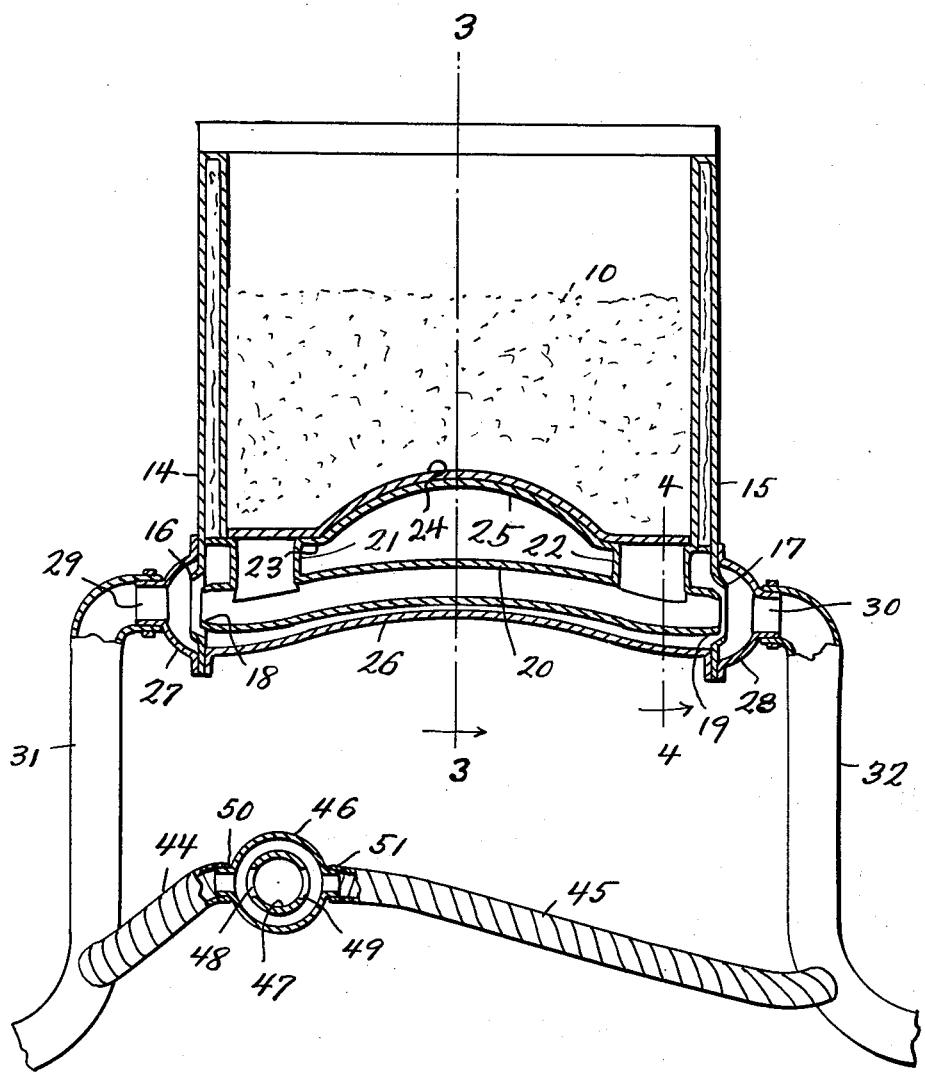
Figure 2 is an enlarged transverse vertical sectional view taken through the sand reservoir and connecting conduits and the engine exhaust tail-pipe.

Referring in detail to the drawings, the numeral 5 generally designates the sand reservoir which consists of a transversely and vertically elongated casing mounted on the rear part of the chassis 6 of the automobile or the like and having its front wall 7 curved to conformably fit in the space behind the rear seat, in the case of a sedan automobile, in an out-of-the-way compact position. The top of the reservoir is open as indicated by the numeral 8 and is provided with a cover 9 which is ordinarily closed to confine the sand 10 within the reservoir. The back and front walls of the reservoir and the side walls thereof are hollow in form and filled with insulating material 11, and the back wall 12 extends below the front wall 13 as clearly indicated in Figure 3 of the drawings, at a point intermediate the ends of the casing. The outer walls 14, 15 of the casing are prolonged downwardly as indicated in Figure 2 and formed with laterally outwardly directed mouths 16, 17, respectively, into which project for a certain distance the jets 18, 19 on the corresponding ends of the blower tube 20 which is carried by respective tubes 21 and 22 which are formed in the bottom 23 of the casing and connect the interior of the casing with the tube 20 while the valve plate 24 is in an open position. The bottom 23 is upwardly arched as indicated by the numeral 25 between the tubes 21 and 22 for the purpose of deflecting the sand 10 toward the tops of the tubes 21 and 22, and the central portion of the valve plate 24 is similarly formed to slide on the said bottom and the valve plate has flat end portions which are adapted to cover the upper ends of the tubes 21 and 22 to prevent discharge of the sand 10 from the casing into the blower tube 20 in an inoperative condition of the device. Spacedly surrounding the lower part of the blower tube 20 is semi-circular casing portion 26 whose opposite ends are fastened to the inner sides of the walls 14 and 15 of the end walls of the casing. Engaging and fastened to the laterally outward sides of these walls 14 and 15 are bells 27, 28 which are arranged concentric with respect to the jets 18, 19 and have the nipple portions 29 and 30, respectively, over which are telescoped the ends of the sand distributing tubes 31, 32. The central portion of the blower tube 20 has a forward extension 33 forming a manifold for connection of the rear end of the blower pipe 34 whose front end is connected as indicated by the numeral 35 to the fitting 36 which is interposed in the exhaust pipe 37 leading from the engine and in advance of the muffler 38, a swingable gate valve 39 being hinged in this fitting to normally close off the arm 35 of this fitting and operable to an open position illustrated in dotted lines in Figure 5 by operation of the lever 40 which is controlled in a manner to be described.

The sand distributing conduits 31 and 32 are hook-shaped and have rearwardly directed flaring terminals 41 and 42, respectively, which direct the sand or the like non-skid material in a downward and rearward direction against the tread of the respective wheels 43 and 44, thereby applying non-skid material to the treads of the wheels as well as to the ground in front of the wheels, enabling the wheels to get a good grip on an otherwise slippery surface.

To maintain the terminal portions of the distributing pipes 31 and 32 free of ice caused by slinging of water from the wheels during the travel of the vehicle, insulated flexible conduits 44 and 45 are provided which are connected in communication with the terminal portions of the distributing conduits and have their opposite ends connected with a jacket 46 surrounding the tail pipe 47, the tail pipe being provided with slits 48 and 49, respectively, in its opposite sides which are registered with the connections 50, 51 of the defrosting conduits 44 and 45 as clearly illustrated in Figure 2 of the drawings, in this way providing for discharge of a portion of the products of combustion passing rearwardly through the tail pipe into the defrosting conduits 44 and 45 for transmission to the terminal portions of the distributing pipes 31 and 32 so as to keep the same in a heated condition precluding freezing of moisture thereon. In this way the distributors are kept perfectly free for the passage of sand during the operation of the automobile.

Figure 1:
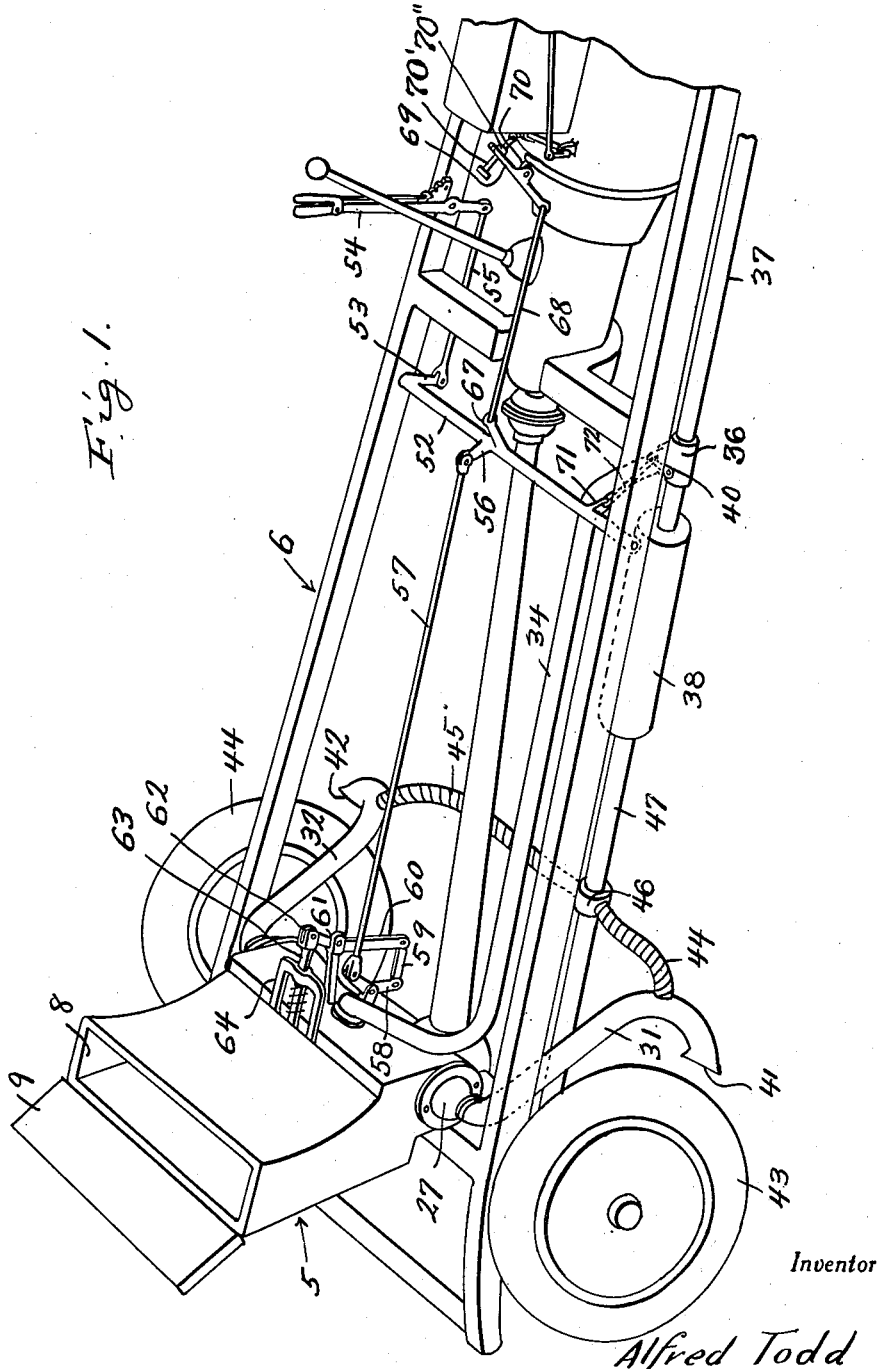
Figure 1 is a general fragmentary perspective view of an automobile showing the chassis thereof with the body removed, and illustrating an application of the present invention thereto.

In the arrangement of the invention illustrated a transverse shaft 52 is suitably mounted on the chassis 8 for rotation on its axis and this has a depending arm 53 which is connected to the lower end of an adjustable lever 54 by a link 55 so that in the rearward position of the lever 54 the shaft is rotated in a counterclockwise direction as seen in Figure 1 so that the upwardly projecting arm 56 on the shaft 52 pushes the rod 57 rearwardly and operates the plate valve 24 in the reservoir to an opened position.

The rear end of the rod 57 is connected to the upper end of a bellcrank 58 whose lower end is connected by a link 59 to the lower end of a lever 60 which is pivoted intermediate its ends on a bracket 61 and has its upper end connected pivotally by a clevis 62 to the bar 63 which slides through the frame 64 and is operatively connected with the valve plate 24 as clearly shown in Figure 3 of the drawings. An expanding spring 65 is located between a stop 66 on the bar 63 and the front of the casing so as to normally urge the valve plate 24 to a closed position. On the shaft 52 is another arm 67 which is connected by a link or rod 68 to the lower end of the accelerator operating pedal 69 which is pivoted as indicated by the numeral 70 intermediate its ends, said pedal having a hole in its front end through which passes the accelerator 70' which has a nut 70'' thereon against which the pedal 69 bears when said pedal is being actuated. Thus when the lever 54 is actuated to open the valve 24 of the sanding device, the pedal 69 will be caused to depress the accelerator so as to speed up the motor to create a greater flow of exhaust gases to the pipes 31 and 32. As can be seen the accelerator can be actuated in the usual manner without interference from the pedal 69. A depending arm 71 is connected by a link 72 to the valve arm 40 which operates the valve 39 in the fitting 36 on the exhaust pipe 37, so that as the valve plate 24 is operated to an open position, the exhaust gases coming through the exhaust pipe 37 will be by-passed through the blower pipe 34 and conveyed into the blower tube or manifold 20 so that as the sand drops through the tubes 21 and 22 into the manifold 20 the sand will be blown out of the jets 18 and 19 and into the distributor pipes 31 and 32 and applied to the wheels in the manner already described.

Although I have shown and described herein a preferred embodiment of my invention, it is to be definitely understood that I do not desire to limit the application of my invention thereto, and any change or changes may be made in the structure and arrangement of the parts, within the spirit of the invention and the scope of the subjoined claims.

Having described the invention, what is claimed as new is:

1. In combination with an automobile including its wheels and exhaust pipe and an accelerator, a hopper extending transversely across a part of the automobile and containing sand, a pair of outlet tubes extending from the bottom of the hopper and one arranged at each side of the hopper, a transversely arranged tube below the hopper and into the end portions of which the tubes discharge, delivery pipes connected with the sides of the hopper and in communication with the transversely extending tube for receiving sand therefrom, said pipes having their discharge ends arranged adjacent front portions of the wheels for discharging sand thereagainst, a valve plate in the bottom of the hopper for controlling the outlet tubes, a pipe having one end connected with a part of the exhaust pipe and the other with the central portion of the transverse tube for introducing exhaust gases into the said tube to force sand therefrom, a second pipe connected with the exhaust pipe and connected with the lower portion of the delivery pipes for introducing exhaust gases into said delivery pipes, valve means for controlling the flow of exhaust gases from the exhaust pipe into the pipe leading to the transverse tube, an accelerator actuating pedal and manually operated means for simultaneously opening the valve plate, the valve controlling the flow of exhaust gases through the pipe leading to the transverse tube and for actuating said pedal for accelerating the motor and causing an increased amount of the exhaust gases to flow through the transverse tube as the valve is opened.

2. In combination with an automobile including its wheels and exhaust pipe and an accelerator, a hopper extending transversely across a part of the automobile and containing sand, a pair of outlet tubes extending from the bottom of the hopper and one arranged at each side of the hopper, a transversely arranged tube below the hopper and into the end portions of which the tubes discharge, delivery pipes connected with the sides of the hopper and in communication with the transversely extending tube for receiving sand therefrom, said pipes having their discharge ends arranged adjacent front portions of the wheels for discharging sand thereagainst, a valve plate in the bottom of the hopper for controlling the outlet tubes, a pipe having one end connected with a part of the exhaust pipe and the other with the central portion of the transverse tube for introducing exhaust gases into the said tube to force sand therefrom, valve means for controlling the flow of exhaust gases from the exhaust pipe into the pipe leading to the transverse tube, an accelerator actuating pedal and manually operated means for simultaneously opening the valve plate, the valve controlling the flow of exhaust gases through the pipe leading to the transverse tube and for actuating said pedal for accelerating the motor and causing an increased amount of the exhaust gases to flow through the transverse tube as the valve is opened.

ALFRED TODD.